US012666118B2

(12) United States Patent 
Sanghavi et al.

(10) Patent No.: US 12,666,118 B2 
(45) Date of Patent: *\*Jun. 23, 2026**

(54) DISTRIBUTING DIGITAL DATA IN A DISTRIBUTED COMPUTING ENVIRONMENT

(71) Applicant: Roku, Inc., San Jose, CA (US)

(72) Inventors: Mehul Sanghavi, San Jose, CA (US); Emily Jeanne Smith, New York, NY (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/888,892

(22) Filed: Sep. 18, 2024

(65) Prior Publication Data

US 2025/0016428 A1      Jan. 9, 2025

Related U.S. Application Data

(63) Continuation of application No. 17/726,280, filed on Apr. 21, 2022, now Pat. No. 12,132,970.

(51) Int. Cl.
  *H04N 21/8355*      (2011.01)
  *H04N 21/24*      (2011.01)
(52) U.S. Cl.
  CPC ..... *H04N 21/8355* (2013.01); *H04N 21/2407* (2013.01)

(58) Field of Classification Search
  CPC ... H04N 21/8355; H04N 21/2407; G06F 8/61
  See application file for complete search history.

(56) References Cited

U.S. PATENT DOCUMENTS

| | | | |
|---|---|---|---|
| 2009/0150319 A1 | 6/2009 | Matson | |
| 2012/0303573 A1 | 11/2012 | Pan | |
| 2014/0074601 A1 | 3/2014 | Delug | |
| 2014/0200991 A1 | 7/2014 | Wu | |
| 2017/0364946 A1 | 12/2017 | Taki | |
| 2018/0053220 A1 | 2/2018 | Bhalgat | |
| 2019/0130436 A1 | 5/2019 | Ma | |
| 2019/0287138 A1 | 9/2019 | Buchalter | |
| 2023/0342129 A1 | 10/2023 | Sanghavi et al. | |

*Primary Examiner* — Michael R Telan 
(74) *Attorney, Agent, or Firm* — Sterne, Kessler, Goldstein & Fox P.L.L.C.

(57)      ABSTRACT

Disclosed herein are system, apparatus, article of manufacture, method and/or computer program product embodiments, and/or combinations and sub-combinations thereof, for distributing digital data. In some embodiments, a server receives a request to distribute digital data to be consumed by a plurality of users. The request indicates that the digital data is to be distributed based on a plurality of parameters and a plurality of resources. The digital data is associated with a digital file. The server identifies an opportunity to distribute the digital data based on a first parameter and a volume of installs of the digital file. Moreover, the server causes the digital data to be distributed such that the digital data is available to be output to the second set of devices using a set of resources based on a limit on resources for the opportunity and the first parameter.

20 Claims, 6 Drawing Sheets

500

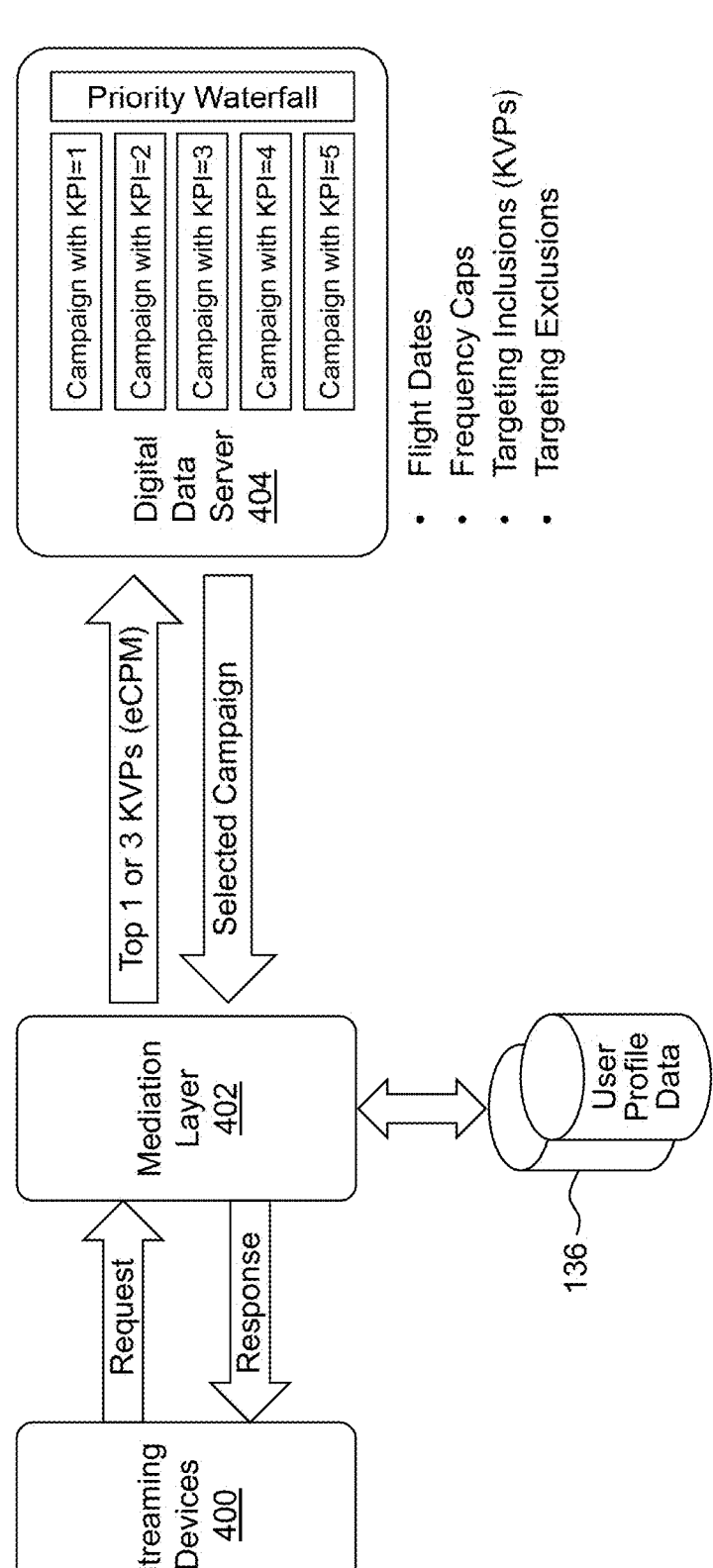

eCPM = CPA x Propensity Score

1. Signup | Channel 1 | 99 | CPA 28$
2. Install | Channel 2 | 99 | CPA 20$
3. FTV | Channel 3 | 98 | CPA 8$

Priority Waterfall

Campaign with KPI=1
Campaign with KPI=2
Campaign with KPI=3
Campaign with KPI=4
Campaign with KPI=5

Digital Data Server 404

- Flight Dates
- Frequency Caps
- Targeting Inclusions (KVPs)
- Targeting Exclusions Top 1 or 3 KVPs (eCPM)

Selected Campaign

Mediation Layer 402

Request

Response

Streaming Devices 400

User Profile Data

502 — Receive a request to distribute digital data

504 — Identify a saturation value

506 — Identify an opportunity to distribute the digital data

508 — Determine a limit of resources

510 — Cause the digital data to be distributed

DISTRIBUTING DIGITAL DATA IN A DISTRIBUTED COMPUTING ENVIRONMENT

CROSS-REFERENCE TO RELATED APPLICATIONS

This application is a continuation of U.S. patent application Ser. No. 17/726,280, filed on Apr. 21, 2022, the contents of which are incorporated herein by reference in its entirety.

BACKGROUND

Field

This disclosure is generally directed to distributing digital data to devices such as media devices.

Background

Entities often distribute digital data to devices in an effort to trigger installs of a digital file. The digital data may be audio and/or video data and the digital file may be an application. Distributing the digital data may involve utilizing resources. Furthermore, an entity may have goals or requirements with respect to the installation of the digital file. However, entities often cannot efficiently and effectively manage resources for distributing the digital data while attempting to meet their goals and requirements. Furthermore, conventional systems do not provide visibility into a lifecycle of the digital data. As such, distributing the digital data to trigger installs of the digital file may be a computationally inefficient, create network bottlenecks, and limit users' access to the digital file.

SUMMARY

Provided herein are system, apparatus, article of manufacture, method and/or computer program product embodiments, and/or combinations and sub-combinations thereof, for distributing digital data.

A given embodiment includes a computer implemented method for distributing digital data. The method includes receiving a request to distribute digital data to be consumed by a plurality of users. The request indicates that the digital data is to be distributed based on a plurality of parameters and a plurality of resources. The digital data is associated with a digital file. The method further includes identifying a volume of installs of the digital file on a first set of devices and identifying an opportunity to distribute the digital data such that the digital data is available to be output to a second set of devices corresponding to the plurality of users based on a first parameter of the plurality of parameters and the volume of installs of the digital file. Additionally, the method includes identifying a limit on resources to be utilized when distributing the digital data for the opportunity. Moreover, the method includes causing the digital data to be distributed such that the digital data is available to be output to the second set of devices using a set of resources of the plurality of resources based on the limit on resources and the first parameter.

Another given embodiment includes a system for distributing digital data. The system includes a memory and a processor coupled to the memory. The processor is configured to receive a request to distribute digital data to be consumed by a plurality of users. The request indicates that the digital data is to be distributed based on a plurality of parameters and a plurality of resources. The digital data is associated with a digital file. The processor is further configured to identify a volume of installs of the digital file on a first set of devices and identify an opportunity to distribute the digital data such that the digital data is available to be output to a second set of devices corresponding to the plurality of users based on a first parameter of the plurality of parameters and the volume of installs of the digital file. Additionally, processor is configured to identify a limit on resources to be utilized when distributing the digital data for the opportunity. Moreover, processor is configured to cause the digital data to be distributed such that the digital data is available to be output to the second set of devices using a set of resources of the plurality of resources based on the limit on resources and the first parameter.

Another given embodiment includes a non-transitory computer-readable medium having instructions stored thereon. The instructions, when executed by at least one computing device, cause the at least one computing device to perform operations comprising receiving a request to distribute digital data to be consumed by a plurality of users. The request indicates that the digital data is to be distributed based on a plurality of parameters and a plurality of resources. The digital data is associated with a digital file. The operations further include identifying a volume of installs of the digital file on a first set of devices and identifying an opportunity to distribute the digital data such that the digital data is available to be output to a second set of devices corresponding to the plurality of users based on a first parameter of the plurality of parameters and the volume of installs of the digital file. Additionally, the operations include identifying a limit on resources to be utilized when distributing the digital data for the opportunity. Moreover, the operations include causing the digital data to be distributed such that the digital data is available to be output to the second set of devices using a set of resources of the plurality of resources based on the limit on resources and the first parameter.

BRIEF DESCRIPTION OF THE FIGURES

The accompanying drawings are incorporated herein and form a part of the specification.

FIG. 4 is a block diagram illustrating components involved in outputting the digital data, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
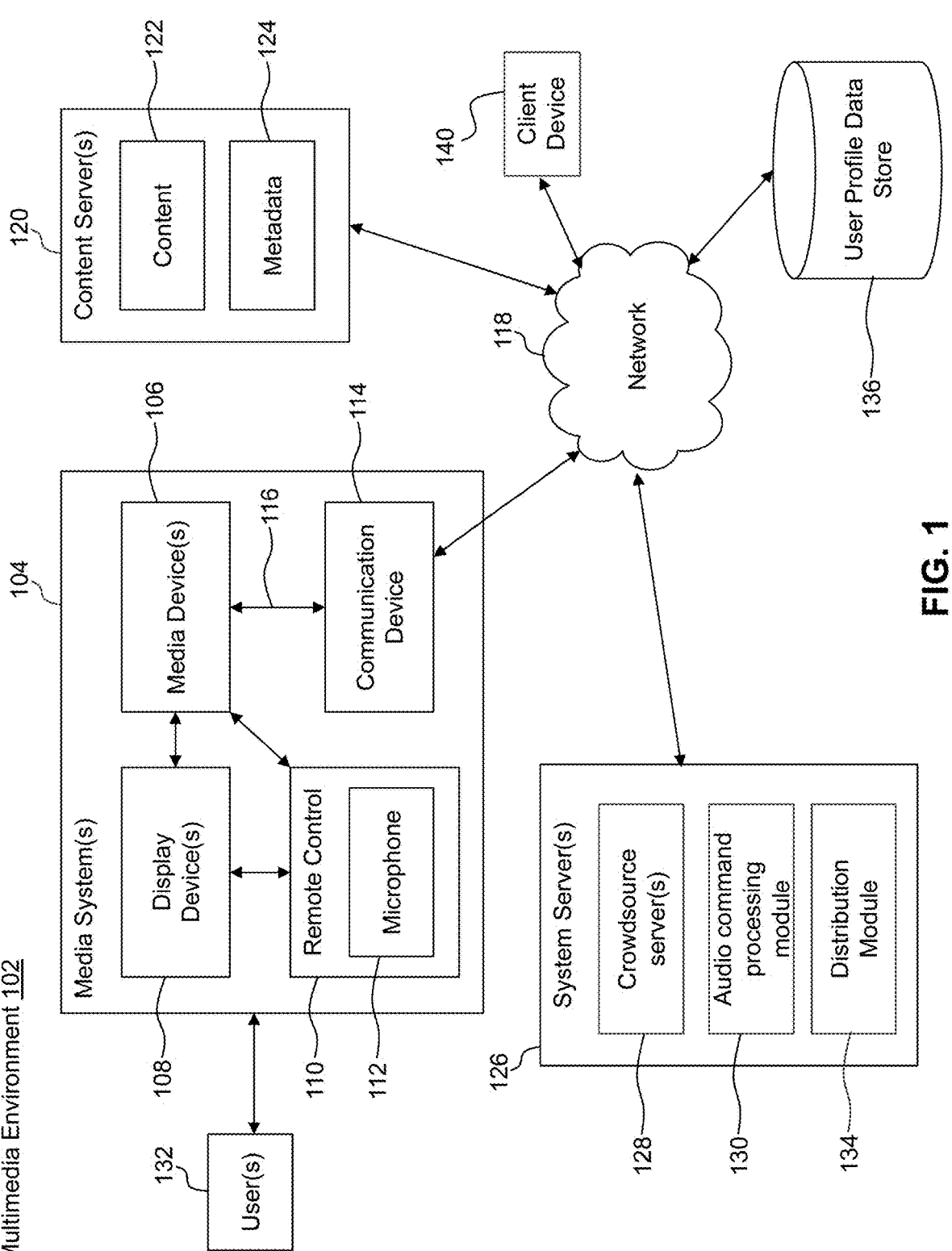
FIG. 1 illustrates a block diagram of a multimedia environment, according to some embodiments.

Provided herein are system, apparatus, device, method and/or computer program product embodiments, and/or combinations and sub-combinations thereof, for distributing digital data in a distributed computing environment (e.g., over the Internet).

As described above, entities (e.g., computing devices, computing clusters, advertisers, etc.) often distribute digital data to trigger installs of a digital file. The digital data may include a link (e.g., hyperlink or Quick Response (QR) code) or instructions for installing the digital file. The digital file may be an application installed on a device (e.g., a media device). As a non-limiting example, the application may be an audio/video streaming application.

The entities often have goals (e.g., triggering a specific number of installs of digital files) when distributing digital data to trigger installs of a digital file on devices. Conventional approaches often require entities to submit individual and isolated requests to distribute the digital data to accomplish their goals. However, entities often lack visibility into the data associated with the success or failure of the achieving their goals. As such, when entities transmit the individual and isolated requests to distribute the digital data in an effort to achieve their goals, they do so without knowledge of the data associated the success or failure of their other goals. As a result, the entities may make mistakes when attempting to distribute digital data. For example, the entities may not appreciate the effectiveness of the digital data, the excess use of resources (e.g., computational resources, network resources, digital assets, assets, currency, etc.) to distribute the digital data, or the like. To this end, and without knowledge of the data associated with the success or failure the other goals, entities may often repeat the same mistakes when transmitting the requests to distribute the digital data in individual isolated requests. Repeatedly making the same mistakes may cause various technical problems.

First, by repeatedly making the same mistakes when transmitting the requests to distribute the digital data, the entities may cause a computational burden on a system to distribute the data. For example, the digital data may be distributed even when it does not have an effect on the entity's goals. This can be computationally expensive.

Second, the mistakes may cause a network bottleneck. For example, an entity's goals may have significant overlap. That is, the entity may be able to achieve multiple goals using a single distribution of digital data. However, individually addressing similar goals in an isolated manner prevents the consolidation of the goals. As a result, this may create a network bottleneck by having the system attempt to unnecessarily distribute the digital data multiple times to achieve similar goals.

Third, the mistakes limit users' access to the digital file. As described above, the entity lacks visibility with respect to the data associated with the success or failure of goals. As such, by allowing the entities to control the distribution of the digital data, provides for an inaccurate understanding of an effective strategy for distributing the digital data. This prevents the digital data from reaching all the users that would be interested in downloading the digital file.

Embodiments described herein address the above-mentioned technical problems by automatically distributing an entity's digital data according to an entity's goals and resources. For example, embodiments described herein provide a holistic lifecycle management system by effectively allocating an entity's resources based on the entity's needs when attempting to distribute digital data. This allows for effectively distributing the digital data and achieving the entity's goals. By doing so, embodiments described herein have an understanding of when, where, and how to distribute the digital data. This eliminates the redundant and unnecessary distribution of the digital data. As a result, embodiments described herein reduce the computational burden on the system distributing the data and reduce network bottlenecks.

Furthermore, embodiments described herein provide a dynamic rules-based heuristic model for distributing the digital data. The embodiments described herein retain control over the distribution of the digital data. In this way, the digital data is distributed to users most likely to download the digital file. As such, embodiments described herein solve the technical problem of limiting a user's access to the digital file by controlling the distribution of the digital data.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
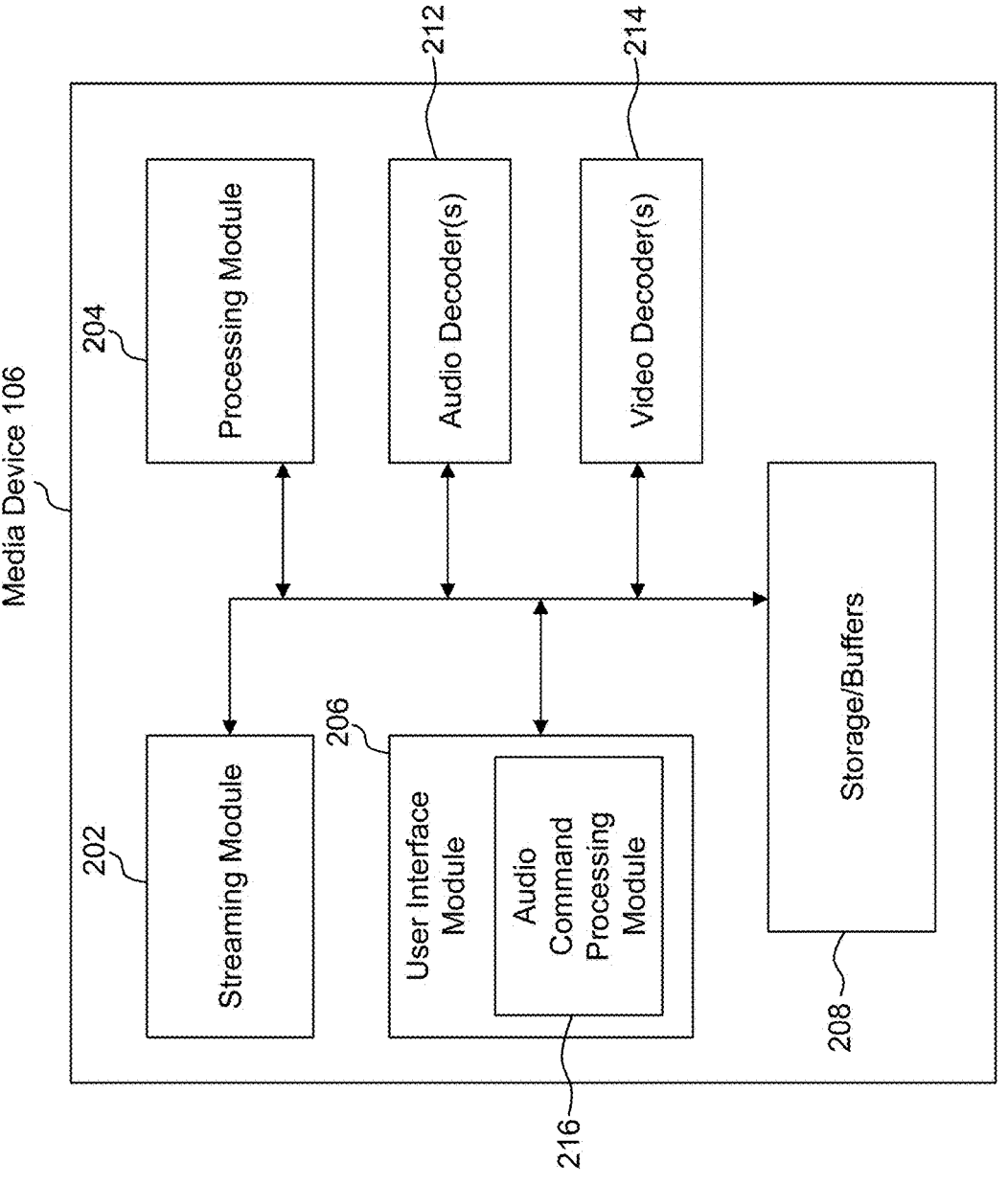
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

In some embodiments, the system servers 126 may also comprise a distribution module 134. Distribution module 134 may distribute digital data based on a request received from client device 140. As a non-limiting example, the digital file may be distributed to content server 120. As such, the digital file may be part of content 122, which is consumed by user 132 using media system 104.

Multimedia environment 102 may also include a user profile data store 136. User profile data store 136 may be one or more databases configured to store user profile data. The user profile data may include data associated with users 132 associated with media systems 104. The data may include username, demographic data, geographic location, channel subscriptions, media purchase history, etc. Distribution module 134 and user profile data store 136 will be described in greater detail with respect to FIG. 3.

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Distributing Digital Data

As described above, users 132 use media systems 104 to consume audio and video content (e.g., content 122). Users 132 may download media channels that may provide content 122 on media systems 104. The media channels may be a digital file (e.g., an application) downloaded and installed on media device 106. The digital file may provide over-the-air (OTA) content or stream content 122 to media device 106. In some embodiments, the digital file may be in communication with a respective content server 120 to provide content 122 on media device 106.

The media channels may be provided or hosted by various entities. Each of these entities may have goals and parameters for a number of downloads of digital file of a respective media channel to be executed on media devices 106. To meet the goals or parameters of the entity, the entity may desire to distribute digital data associated with the digital file. The digital data may be text, image, audio, or video data that provide information for downloading the digital file. Distributing the digital data may expend an amount of the entity's resources.

For example, an entity may use client device 140 to transmit a request to distribution module 134. The request may be for distributing digital data associated with the digital file according to the entity's parameters and resources. The parameters may be the entity's desired goals.

Over a period of time and incrementally, distribution module 134 may identify opportunities to distribute the digital data for the entity based on the entity's parameters and resources. Distribution module 134 may cause the digital data to be distributed such that the digital data is available to be consumed by each of a set of users 132 using their respective media system 106.

Figure 3:
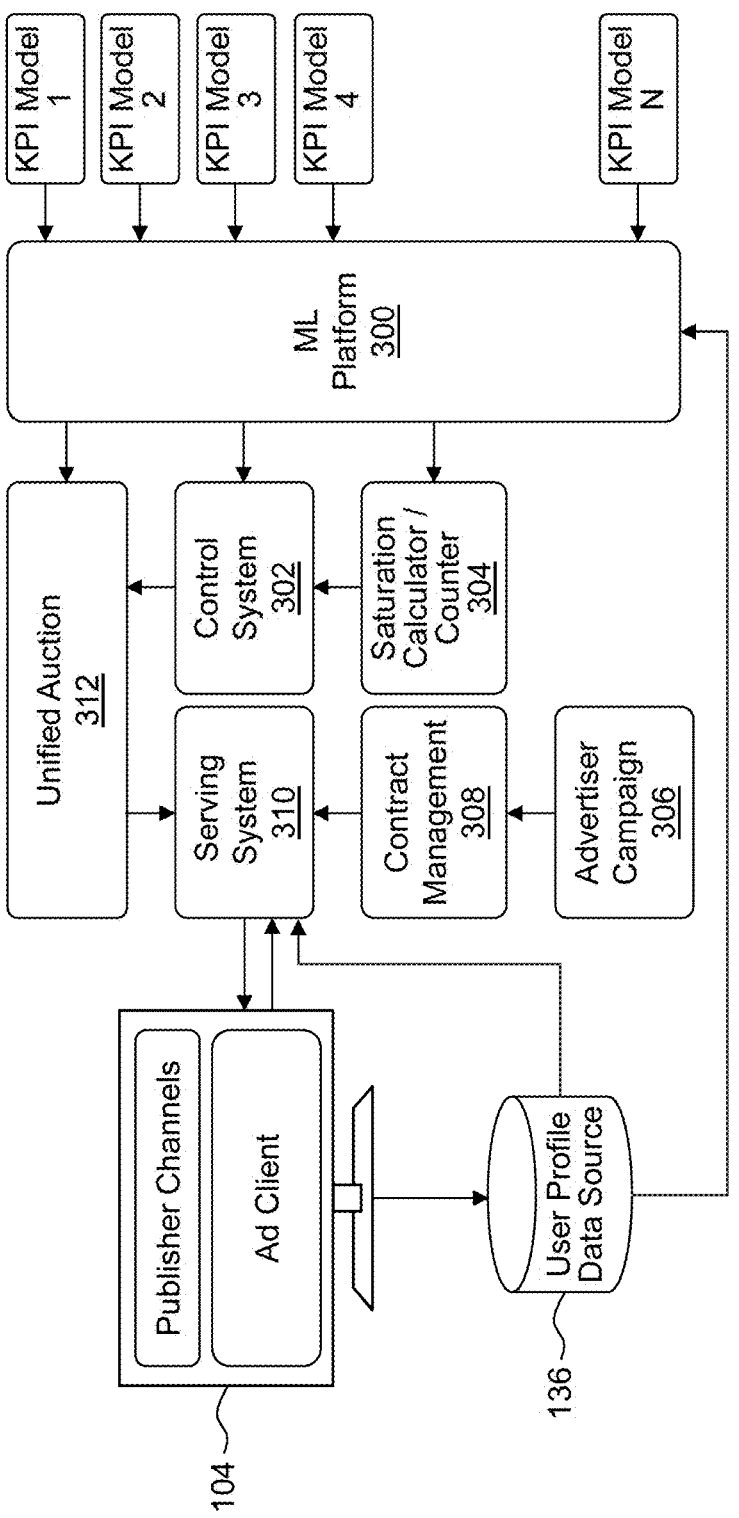
FIG. 3 is a block diagram illustrating components used to distribute digital data, according to some embodiments.

FIG. 3 is a block diagram illustrating components used to distribute digital data, according to some embodiments. FIG. 3 will be described in reference to FIG. 1, however, is not limited to that embodiment.

As described above, an entity may use client device 140 to transmit a request to distribution module 134 to distribute digital data associated with a digital file. The digital file may be a media channel configured to provide content 122. The request may include the digital data, parameters, and resources.

The parameters may be the entity's desired goals for users 132 to download the digital file. For example, the parameters may indicate a desired number of downloads over a predetermined period of time, a desired number of downloads for specific types of user, a desired number of downloads for specified geographic locations, etc. The specific types of users may be age groups, ethnicity, users with certain viewing habits, etc. The resources may be for distributing the digital data.

Distribution module 134 may build key performance indicator (KPI) models based on the entity's parameters. A KPI model may define one or more of the entity's parameters (e.g., goals) to be achieved. The KPI model may define the events that trigger the success or failure of a goal. For example, suppose the parameter is a desired number of downloads over a predetermined period of time. In that case, the KPI model may define a number of downloads, a pace at which the downloads should occur to achieve the parameter, a threshold measurement of successfully achieving the parameter, a threshold measurement of failing to achieve the parameter, etc.

In this regard, distribution module 134 may generate KPI model 1, KPI model 2, KPI model 3, KPI model 4 . . . . KPI model N. Each KPI model may be associated with a different parameter. Distribution module 134 may input KPI models 1-N into machine learning (ML) platform 300.

ML platform 300 may implement a machine-learning algorithm to identify targeted users 132 to consume the digital data. For example, ML platform 300 may retrieve user profile data from user profile data store 136. The user profile data may include usernames, geographic locations, demographic data, viewing history, media purchase history, etc. The user profile data may be collected by each user 132's media system 104. In some embodiments, user profile data store 136 may be configured to stream the user profile data to ML platform 300.

ML platform 300 may understand the entity's parameters using the KPI models 1-N. To this end, ML platform 300 may use the machine learning algorithm to identify targeted users 132 that are likely to download the digital file based on consuming the digital data based on the entity's parameters, as defined by KPI models 1-N, and the user profile data of users 132.

In some embodiments, the machine learning algorithm may assign a score to each user based on the user profile data and the entity's parameters, as defined by KPI models 1-N. For example, if KPI model 1 indicates that the entity's parameter is for the desired number of digital file downloads in a predetermined geographic location, the machine learning algorithm may assign higher scores to users 132 in the predetermined geographic location. In another example, the machine-learning algorithm may determine that a given user 132 may be interested in downloading a media channel (e.g., the digital file) based on their viewing history and media purchase history. As such, the machine-learning algorithm may assign a higher score to the given user 132. ML platform 300 may identify the targeted users 132 that are assigned a score higher than a threshold score. The machine-learning algorithm may be a supervised or unsupervised machine-learning algorithm.

ML platform 300 may transmit the digital data, the user profile data associated with the identified targeted users 132, and the entity's parameters and resources to control system 302. Control system 302 may reside within distribution module 134.

Control system 302 may use the entity's parameters and resources to identify opportunities to distribute the digital data. An opportunity to distribute digital data may indicate that the digital data may be distributed given the entity's resources, and distributing the digital data will achieve one or more of the entity's parameters. Each opportunity may be associated with a different parameter. Alternatively, two or more opportunities may be associated with achieving a parameter. The opportunity allows for distributing the digital data for a predetermined amount of time. Furthermore, distributing the digital data may involve making the digital data available to a set of media systems 104 such that it is periodically output by the set of media systems 104 over a period of time. Control system 302 may use one or more factors to identify the opportunities to distribute the digital data.

The one or more factors may include a saturation value. Control system 302 may transmit a request to saturation calculator/counter 304 to retrieve a saturation value of the digital file. Saturation calculator/counter 304 may determine a saturation value of the digital file based on a volume of installs of the digital file. A higher saturation value may indicate a less likelihood of further installs or downloads of the digital file. Saturation calculator/counter 304 may return the saturation value to control system 302. The saturation value may be continuously updated as the digital file is installed on additional media systems 104. Saturation calculator/counter 304 may reside within distribution module 134.

The one or more factors may also include an amount of resources needed to distribute the digital data, the amount of resources remaining for the entity, the number of media systems 104 to output the digital data, a frequency to output the digital data, the geographic locations of media systems 104, a length of time the digital data will be output, type of the entity, etc.

The amount of resources needed to distribute the digital data may be determined based on a quantity of media systems 104 that will be outputting the digital data, time period (e.g., day of the week, time of the year, holidays, etc.), type of digital data, etc. The amount of resources needed to distribute the digital data may fluctuate based on the time of day, week, or year.

Control system 302 may monitor the entity's resources when identifying the opportunities to distribute the digital data. For example, control system 302 may attempt to expend the entity's resources when distributing the digital data at a pace that allows control system 302 to achieve at least a threshold number of the entity's parameters. Control system 302 may project the amount of resources that each of the entity's parameters may require. As such, when identifying the opportunities to distribute the digital data, control system 302 may determine a limit of resources to be expended for a given opportunity. Each opportunity may be for a given amount of time (e.g., 3 months, 6 months, 12 months, etc.).

In some embodiments, control system 302 may monitor the digital data distributed by other entities when identifying the opportunities to distribute the digital data. The other entities may be associated with media channels. For example, control system 302 may determine that the other entities are associated with larger and more popular media channels than the entity. Furthermore, control system 302 may determine that the other entities have distributed digital data for downloading the larger and more popular media channels. As such, control system 302 may determine that distributing the entity's parameters may not be achieved because users may not consume the based on the digital data distributed by other entities.

When identifying the opportunities to distribute the digital data, control system 302 may also identify a set of users 132 from the identified targeted users 132 that are likely to download the digital file based on consuming the digital data. Moreover, control system 302 may determine that the set of users 132 downloading the digital file may achieve one or more of the entity's parameters. Control system 302 may identify a set of media systems 104 associated with the set of users 132. The set of media systems 104 are to output the digital data to be consumed by the set of users 132.

In response to identifying an opportunity to distribute the digital data, control system 302 may transmit a request to unified auction 312 to distribute the digital data. Unified auction 312 may implement an auction to obtain the rights to distribute the digital data. The auction may involve one or more entities. Entities may submit bids to obtain the rights to distribute digital data. Unified auction 312 may reside outside distribution module 134.

For an identified opportunity, control system 302 may bid the entity's resources in the auction to distribute the digital data based on an identified limit of the entity's resources to expend for the identified opportunity. In response to winning the auction, unified auction 312 may distribute the digital data to serving system 310. Control system 302 may deduct the resources needed to win the auction from the entity's resources.

Serving system 310 may reside outside distribution module 134. In some embodiments, serving system 310 may be part of content server 120. Contract management 308 may store the contract details associated with the entity. Ad campaign 306 may store the campaign details associated with the entity and digital data. Serving system 310 may communicate with contract management 308 and advertiser campaign 306 to identify the contract and campaign details. The contract and campaign details may include information associated with timings, frequency, characteristics, platforms, etc., for outputting the digital data.

Serving system 310 may embed the digital data in content 122 consumed by the set of users 132. Serving system 310 may embed the digital data in content 122 based on the contract and campaign details. For example, if a given user requests content 122 to be transmitted to media system 104, serving system 310 may embed the digital data in the media system 104. The content 122 with the embedded digital data may be transmitted by the set of media systems 104 when requested by the set of users 132. This way, the set of users 132 may consume the digital data.

Control system 302 may monitor the installs of the digital file triggered based on the digital data on the set of media systems 104. Specifically, control system 302 may monitor the number of installs of the digital file while the digital data is in distribution. In some embodiments, the digital data may include a link to download or install the digital file. As such, control system 302 may monitor the number of times the link in the digital data is actuated.

In some embodiments, the goals or parameters of an entity may be other types of events triggered by the distribution and consumption of the digital data. For example, the events may be a user consuming the media channel for the first time, a user visiting the download page of the digital file, the user selecting a link embedded in the digital data, etc. As such, control system 302 may monitor the above-referenced events triggered based on the consumption of the digital data.

Control system 302 may determine whether the entity's parameters are achieved based on the installs of the digital file. Control system 302 may continue to identify opportunities for distributing the digital data until all of the parameters have been achieved, a predetermined period of time, or the entity's resources have been completely expended.

In response to determining that the entity's resources have been completely expended and all of the parameters have not been achieved, control system 302 may transmit an alert to client device 140. The alert may indicate that the entity may add additional resources so that control system 302 may continue to identify opportunities to distribute the digital data.

As a non-limiting example, the digital data may be a digital advertisement for downloading a digital file of a media channel. The entity's resources may be a form of currency or payment for distributing the advertisement. The digital advertisement may be embedded in OTA or streaming content 122. As a non-limiting example, the digital advertisement may be embedded at the beginning, middle, or end of the content 122.

For example, advertiser A may have distributed a digital file for a new channel that is available for download and installation on media systems 104. Since the channel is new, advertiser A may want to attract new users 132 to download and install the digital file on media systems 104. As such, the initial parameter for advertiser A may be having a predetermined amount of new users 132. Advertiser A may have additional parameters once the initial parameter is achieved.

Advertiser A may use client device 140 to transmit a request to distribution module 134 to distribute a digital advertisement associated with the new media channel. The request may include the digital advertisement, the initial parameter and additional parameters, and a budget for distributing the digital advertisement.

Distribution module 134 may generate KPI models for achieving the initial parameter and the additional parameters. Distribution module 134 may transmit the KPI models, digital advertisement, initial parameter and additional parameters, and budget for distributing the digital advertisement to ML platform 300.

ML platform 300 may identify targeted users 132 likely to download the digital file for the new media channel according to the initial parameter and additional parameters. ML platform 300 may transmit the user profile data of the identified targeted users 132 digital advertisement, KPI models, initial parameter and additional parameters, and budget for distributing the digital advertisement to control system 302.

Control system 302 may identify opportunities to distribute the digital advertisement according to the advertiser A's budget and the initial and additional parameters, as defined by the KPI models. Control system 302 may use one or more factors to identify opportunities to distribute the digital advertisement.

Control system 302 may allocate the budget for distributing the digital advertisement so that after the initial parameter is achieved, control system 302 may attempt to achieve the additional parameters. As such, control system 302 may identify a limit for the budget when identifying an opportunity to distribute the digital advertisement.

Control system 302 may identify a set of users 132 of the identified targeted users 132 that are likely to download the digital file of the new media channel in accordance with the initial parameter. For example, the set of users 132 may be users that have never downloaded the new channel. As such, the set of users 132 may be new users 132.

Control system 302 may transmit a request to unified auction 312. Unified auction 312 may execute an auction for obtaining rights to distribute the digital advertisement. Control system 302 may attempt to obtain the rights to distribute the digital advertisement in the auction at the limit for budget for achieving the initial parameter. In response to obtaining the rights, unified auction 312 may transmit a request to serving system 310 to distribute the digital advertisement.

Serving system 310 may communicate with advertiser campaign 306 to determine the advertiser A's campaign details. Furthermore, serving system 310 may communicate with contract management 308 to determine advertiser A's contract details. Serving system 310 may embed the digital advertisement in content 122 requested by the set of users 132 in accordance with the contract and campaign details.

Control system 302 may monitor the number of installs of the digital file of the new media channel while the digital advertisement is in distribution. Control system 302 may determine whether the initial parameter is achieved based on the number of installs. Once the initial parameter is achieved, control system 302 may attempt to identify opportunities for distributing the digital advertisement for achieving the additional parameters in accordance with advertiser A's budget. In some embodiments, control system 302 may identify opportunities for distributing the digital advertisement for achieving the initial and additional parameters concurrently.

In some embodiments, control system 302 may also determine the number of subscriptions to the new media channel and a number of cancellations. This allows control system 302 to keep track of retention levels of the users 132 while attempting to achieve the additional parameters.

In light of the above, control system 302 may automatically adjust advertiser A's budget for distributing the digital advertisement according to advertiser A's parameters, as defined by the KPI models. This prevents advertiser A from having to identify individual KPIs and attempting to achieve a single KPI at a time. As such, this allows for an efficient use of advertiser A's budget.

FIG. 4 is a block diagram illustrating components involved in outputting the digital data, according to some embodiments.

In some embodiments, streaming device(s) 400 may be part of media systems 104. For example, streaming device 400 may be media device 106. Streaming device 400 may be configured to stream content 122 to be consumed by users 132. Streaming device 400 may be associated with one or more users 132.

Streaming device 400 may request content 122, including digital data from mediation layer 402. As indicated above, the digital data may be digital advertisements to be embedded in content 122. Mediation layer 402 may evaluate digital data corresponding to various media channels (e.g., channel 1, 2, or 3) that should be consumed by targeted users 132. The digital data that should be viewed by targeted users 132 may be pooled together in a single auction.

For example, mediation layer 402 may transmit a request to digital data server 404 retrieve digital data for the top three campaigns for which digital data should be viewed by targeted users 132. The top three campaigns may be include digital data for channel 1, 2, and/or 3. Digital data server 404 may analyze the digital data for the top three campaigns for which digital data should be viewed by targeted users 132 and their corresponding devices.

Digital data server 404 may be part of serving system 310, as shown in FIG. 3. Digital data server 404 may include campaign for KPI=1–campaign for KPI=5. Digital data server 404 may identify the top three campaigns for the top channels the best cost per mile/cost per thousand (eCPM). The eCPM may be a price for every 1,000 impressions. An impression may be a viewing of the digital advertisement. The eCPM may be calculated based on a cost per action (CPA) and propensity score. The propensity score may be a likelihood that the user will download the digital file associated with the digital advertisement.

Digital data server 404 may identify the top three campaigns with the best eCPM for the targeted users 132. Digital data server 404 may consider include campaign priority tiers laid out by pricing model, importance, price, action, internal value etc. Digital data server 404 may transmit the three campaigns with the top three eCPM values to Mediation layer 402. Mediation layer 402 may execute a digital auction between the top three campaigns. The auction may be implemented as described above. Mediation layer 402 may embed the digital data of the campaign that won the auction into content 122. Mediation layer 402 may transmit the content 122 with the digital data to streaming devices 400 of the targeted users 132.

Mediation layer 402 may track the installs of the digital files associated with the digital advertisements in streaming device 400. Mediation layer 402 may store the install information in user profile data store 136 for the one or more users 132.

Figure 5:
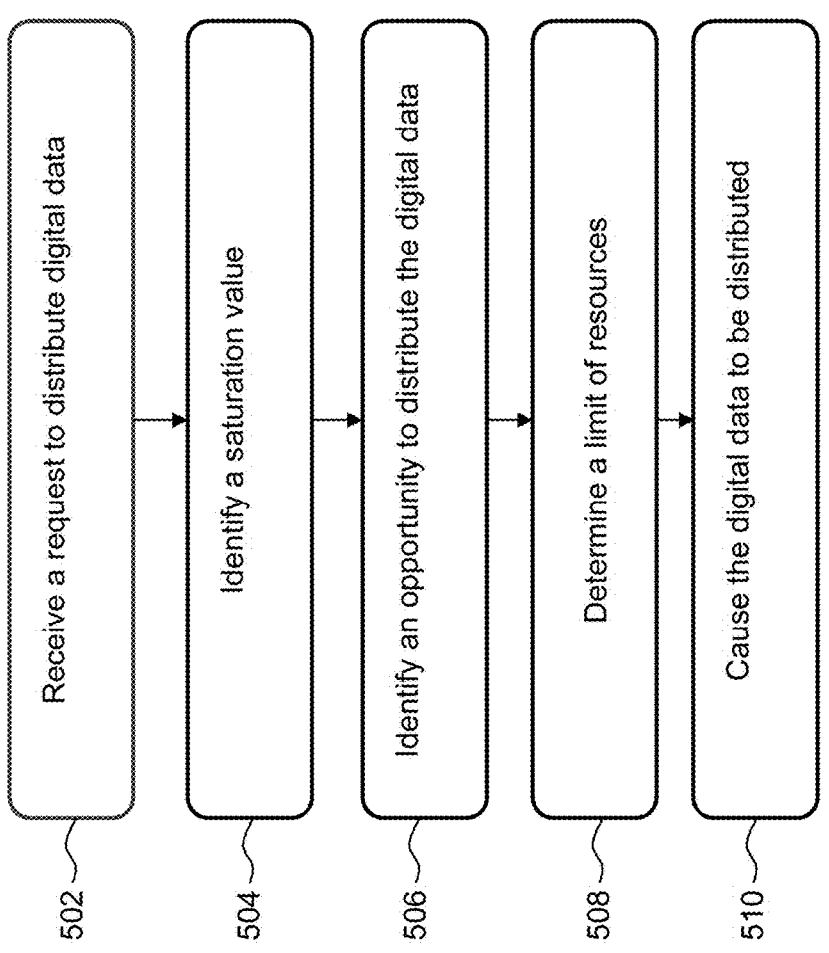
FIG. 5 is a flowchart illustrating a process for distributing digital data, according to some embodiments.

FIG. 5 is a flowchart illustrating a process for distributing digital data, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 5, as will be understood by a person of ordinary skill in the art.

Method 500 shall be described with reference to FIGS. 1-3. However, method 500 is not limited to that example embodiment.

In 502, distribution module 134 receives a request to distribute digital data to be consumed by targeted users 132. The request indicates that the digital data is to be distributed based on the entity's parameters and resources. The digital data may be associated with a digital file. The digital data may include information for downloading and/or installing the digital file. Distribution module 134 may receive the request from client device 140. The digital data is to be output by media systems 104. In some embodiments, the digital data is to be embedded in content 122. ML platform 300 may identify the targeted users 132 that are likely to download the digital file based on consuming the digital data.

In 504, saturation calculator/counter 304 identifies a saturation value for the digital file. The saturation value may indicate a volume of existing installs on the digital file.

In 506, control system 302 identifies an opportunity to distribute the digital data such that the digital data is available to be output to a set of media systems 104 associated the targeted users 132 based on a first parameter of the plurality of parameters and the volume of installs of the digital file. Control system 302 may identify the opportunities based on the one or more parameters, saturation value, and one or more other factors. The one or more other factors may include an amount of resources needed to distribute the digital data.

In 508, control system 302 determines a limit of resources needed to distribute the digital data for a given opportunity. Control system 302 may determine the limit based on the first parameter, remaining resources, time of the year/day/week, etc.

In 510, control system 302 causes the digital data to be distributed such that the digital data is available to be output to the set of devices using a set of resources of based on the limit on resources and the first parameter. Control system 302 may transmit a request to unified auction 312 to obtain the rights to distribute the digital data. Control system 302 may attempt to obtain the rights to distribute the digital data within the constraints of the limit of resources. In response to obtaining the rights, serving system 310 may embed the digital data into content 122 requested by the set of users operating the set of devices, in accordance to contract and campaign details. In response to obtaining the rights, control system 302 may deduct the resources used to obtain the rights from the entity's remaining resources.

Example Computer System

Figure 6:
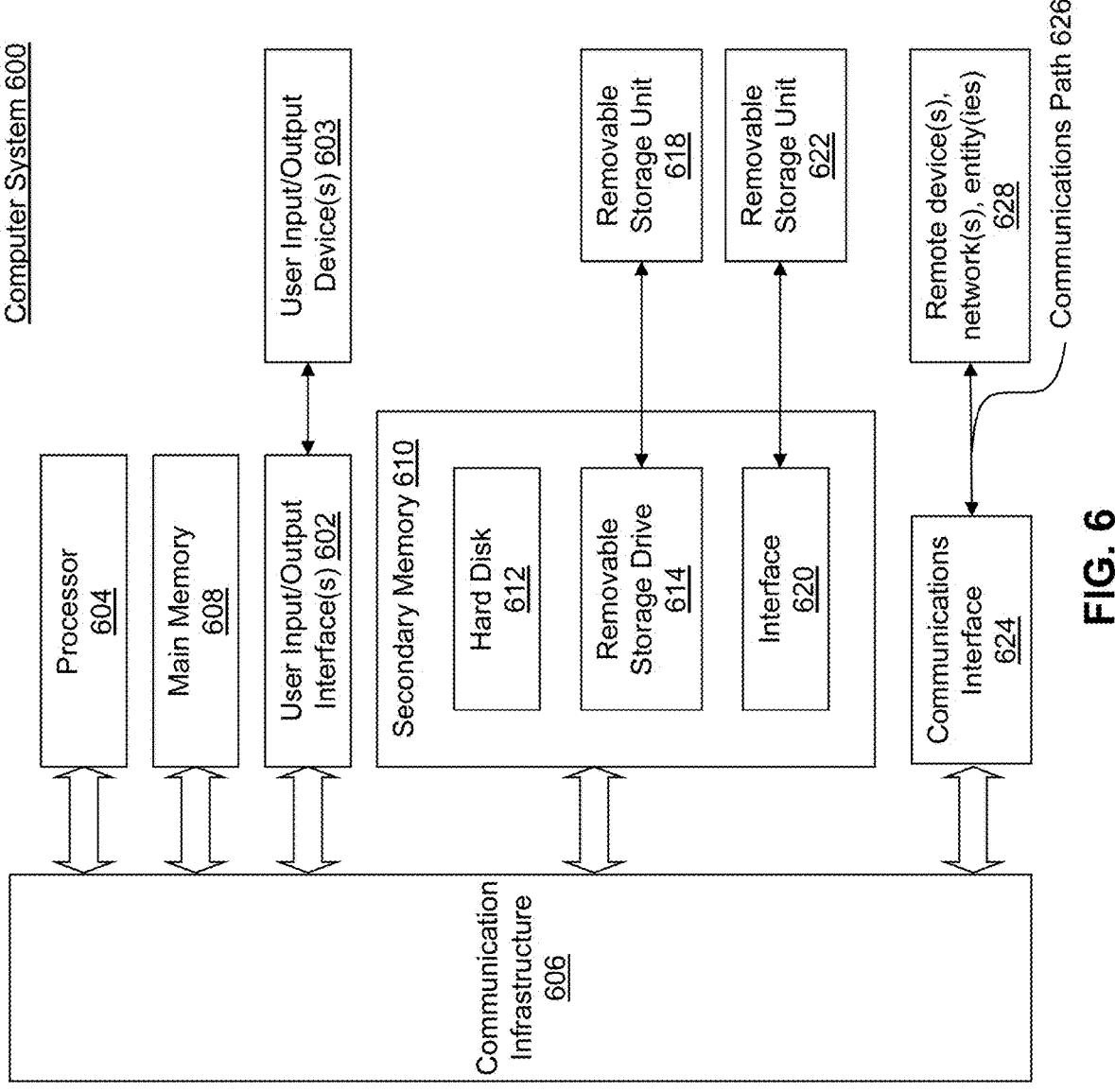
FIG. 6 illustrates an example computer system useful for implementing various embodiments.

Various embodiments may be implemented, for example, using one or more well-known computer systems, such as computer system 600 shown in FIG. 6. For example, the media device 106 may be implemented using combinations or sub-combinations of computer system 600. Also or alternatively, one or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system

600, main memory 608, secondary memory 610, and removable storage units 618 and 622, as well as tangible articles of manufacture embodying any combination of the foregoing. Such control logic, when executed by one or more data processing devices (such as computer system 600 or processor(s) 604), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for distributing digital data, the computer implemented method comprising:

receiving, by at least one computer processor, a request to distribute the digital data to be consumed by a plurality of users, wherein the digital data is associated with a digital file;

identifying a saturation value associated with the digital file on a first set of devices, wherein the saturation value indicates a volume of installs of the digital file on the first set of devices, and a higher saturation value indicates less likelihood of further installs of the digital file;

identifying an opportunity to distribute the digital data such that the digital data is available to be output to a second set of devices corresponding to the plurality of users based on the saturation value; and causing the digital data to be distributed such that the digital data is available to be output to the second set of devices based on the saturation value.

2. The computer implemented method of claim 1, further comprising:

monitoring a number of installs of the digital file while the digital data is distributed;

identifying the opportunity to distribute the digital data such that the digital data is available to be output to the second set of devices corresponding to the plurality of users based on the saturation value and the number of installs; and causing the digital data to be distributed such that the digital data is available to be output to the second set of devices based on the saturation value and the number of installs.

3. The computer implemented method of claim 2, further comprising:

determining whether a first parameter is achieved based on the number of installs;

identifying an additional opportunity for achieving a second parameter in response to determining the number of installs is achieved; and causing the digital data to be distributed such that the digital data is available to be output to the second set of devices based on the saturation value and the second parameter.

4. The computer implemented method of claim 1, further comprising:

identifying a limit on resources to be utilized when distributing the digital data for the opportunity, and wherein the causing the digital data to be distributed comprises causing the digital data to be distributed such that the digital data is available to be output to the second set of devices based on the saturation value and the limit on resources.

5. The computer implemented method of claim 1, wherein the digital data is embedded in an audio or video content, and the audio or video content is output to the second set of devices.

6. The computer implemented method of claim 1, further comprising:

generating a score for each user of the plurality of users based on a likelihood that the respective user will download the digital file; and determining that the digital data is to be consumed by the plurality of users based on a respective score of each of the plurality of users.

7. The computer implemented method of claim 1, further comprising:

obtaining rights to distribute the digital data using one or more resources.

8. A system for distributing digital data, the system comprising:

one or more memories; and at least one processor each coupled to at least one of the memories and configured to perform operations comprising:

receiving a request to distribute the digital data to be consumed by a plurality of users, wherein the digital data is associated with a digital file;

identifying a saturation value associated with the digital file on a first set of devices, wherein the saturation value indicates a volume of installs of the digital file on the first set of devices, and a higher saturation value indicates less likelihood of further installs of the digital file;

identifying an opportunity to distribute the digital data such that the digital data is available to be output to a second set of devices corresponding to the plurality of users based on the saturation value; and causing the digital data to be distributed such that the digital data is available to be output to the second set of devices based on the saturation value.

9. The system of claim 8, wherein the operations further comprise:

monitoring a number of installs of the digital file while the digital data is distributed;

identifying the opportunity to distribute the digital data such that the digital data is available to be output to the second set of devices corresponding to the plurality of users based on the saturation value and the number of installs; and causing the digital data to be distributed such that the digital data is available to be output to the second set of devices based on the saturation value and the number of installs.

10. The system of claim 9, wherein the operations further comprise:

determining whether a first parameter is achieved based on the number of installs;

identifying an additional opportunity for achieving a second parameter in response to determining the number of installs is achieved; and causing the digital data to be distributed such that the digital data is available to be output to the second set of devices based on the saturation value and the second parameter.

11. The system of claim 8, wherein the operations further comprise:

identifying a limit on resources to be utilized when distributing the digital data for the opportunity, and wherein to cause the digital data to be distributed, the at least one processor is configured to cause the digital data to be distributed such that the digital data is available to be output to the second set of devices based on the saturation value and the limit on resources.

12. The system of claim 8, wherein the digital data is embedded in an audio or video content, and the audio or video content is output to the second set of devices.

13. The system of claim 8, wherein the operations further comprise:

generating a score for each user of the plurality of users based on a likelihood that the respective user will download the digital file; and determining that the digital data is to be consumed by the plurality of users based on a respective score of each of the plurality of users.

14. The system of claim 8, wherein the operations further comprise:

obtaining rights to distribute the digital data using one or more resources.

15. A non-transitory computer-readable medium having instructions stored thereon that, when executed by at least one computing device, cause the at least one computing device to perform operations comprising:

receiving a request to distribute digital data to be consumed by a plurality of users, wherein the digital data is associated with a digital file;

identifying a saturation value associated with the digital file on a first set of devices, wherein the saturation value indicates a volume of installs of the digital file on the first set of devices, and a higher saturation value indicates less likelihood of further installs of the digital file;

identifying an opportunity to distribute the digital data such that the digital data is available to be output to a second set of devices corresponding to the plurality of users based on the saturation value; and causing the digital data to be distributed such that the digital data is available to be output to the second set of devices based on the saturation value.

16. The non-transitory computer-readable medium of claim 15, wherein the operations further comprise:

monitoring a number of installs of the digital file while the digital data is distributed;

identifying the opportunity to distribute the digital data such that the digital data is available to be output to the second set of devices corresponding to the plurality of users based on the saturation value and the number of installs; and causing the digital data to be distributed such that the digital data is available to be output to the second set of devices based on the saturation value and the number of installs.

17. The non-transitory computer-readable medium of claim 16, wherein the operations further comprise:

determining whether a first parameter is achieved based on the number of installs;

identifying an additional opportunity for achieving a second parameter in response to determining the number of installs is achieved; and causing the digital data to be distributed such that the digital data is available to be output to the second set of devices based on the saturation value and the second parameter.

18. The non-transitory computer-readable medium of claim 15, wherein the operations further comprise:

identifying a limit on resources to be utilized when distributing the digital data for the opportunity, and wherein the causing the digital data to be distributed comprises causing the digital data to be distributed such that the digital data is available to be output to the second set of devices based on the saturation value and the limit on resources.

19. The non-transitory computer-readable medium of claim 15, wherein the digital data is embedded in an audio or video content, and the audio or video content is output to the second set of devices.

20. The non-transitory computer-readable medium of claim 15, wherein the operations further comprise:

generating a score for each user of the plurality of users based on a likelihood that the respective user will download the digital file; and determining that the digital data is to be consumed by the plurality of users based on a respective score of each of the plurality of users.

* * * * *